US006947238B2

(12) United States Patent
Takayoshi et al.

(10) Patent No.: US 6,947,238 B2
(45) Date of Patent: Sep. 20, 2005

(54) BIAS CIRCUIT FOR MAGNETO-RESISTIVE HEAD

(75) Inventors: Kazue Takayoshi, Kagoshima (JP); Michiya Sako, Kagoshima (JP)

(73) Assignee: Sony Corporation (JP)

( * ) Notice: Subject to any disclaimer, the term of this patent is extended or adjusted under 35 U.S.C. 154(b) by 113 days.

(21) Appl. No.: 10/452,290

(22) Filed: Jun. 3, 2003

(65) Prior Publication Data

US 2003/0227704 A1 Dec. 11, 2003

(30) Foreign Application Priority Data

Jun. 11, 2002 (JP) .................................... P2002-169419

(51) Int. Cl.[7] .............................................. G11B 5/03
(52) U.S. Cl. ............................ 360/66; 360/46; 360/67
(58) Field of Search ............................ 360/46, 66, 67

(56) References Cited

U.S. PATENT DOCUMENTS 5,204,789 A * 4/1993 Jove et al. ..................... 360/67
5,877,911 A * 3/1999 Klaassen et al. .............. 360/67
6,147,824 A * 11/2000 Shibasaki et al. ............. 360/46
6,522,491 B1 * 2/2003 Kawai ........................... 360/66

* cited by examiner

Primary Examiner—David Hudspeth
Assistant Examiner—Dan I Davidson
(74) Attorney, Agent, or Firm—Rader, Fishman & Grauer, PLLC; Ronald P. Kananen

(57) ABSTRACT

A bias circuit for a magneto-resistive head having a bias current output circuit for flowing a bias current through a magneto-resistive head, and a feedback circuit for controlling the bias current from a bias current output circuit by detecting voltage variation across the magneto-resistive head so that a voltage across the magneto-resistive head becomes a predetermined value. The bias current output circuit comprises a regulating circuit for regulating an operation of the bias current output circuit in the bias current output circuit, a control circuit for controlling the regulating circuit to be in a predetermined condition, and a switching circuit for switching a read/write condition for activating the control circuit for the regulating circuit in a non-read condition of the magneto-resistive head. The regulating circuit includes an oscillation suppressing capacitor; and the control circuit for the regulating circuit is a charging circuit for the oscillation suppressing capacitor.

3 Claims, 4 Drawing Sheets

BIAS CIRCUIT FOR MAGNETO-RESISTIVE HEAD

CROSS REFERENCE TO RELATED APPLICATION

This application claims priority from Japanese Priority Document No. 2002-169419, filed on Jun. 11, 2002 with the Japanese Patent Office, which document is hereby incorporated by reference.

BACKGROUND OF THE INVENTION

1. Field of the Invention

The present invention is related to a bias circuit for a read MR (Magneto-Resistive) head applied to a magnetic recording and/or reproducing apparatus, such as a HDD (Hard Disk Drive) or the like.

2. Description of the Related Art

Conventionally, in a magnetic recording and/or reproducing apparatus, such as a Hard Disk Drive for recording necessary data by magnetizing a magnetic layer formed on a rotating recording disk, a Magneto-Resistive head (MR head) is usually used to read out recorded data in a case of reading the recorded data.

Such a MR head is positioned opposite to the recording disk, and it is possible to carry out the reading of the recorded data by outputting a change of magnets in the magnetic layer of the recording disk as a change of resistive value of the MR head.

In this case, it is necessary to flow a bias current through the MR head using a bias circuit in advance, and the Voltage bias system, which controls a voltage applied to the MR head, is well-known as a bias system for such a bias circuit.

As shown in FIG. 3, a bias circuit a of the Voltage bias system is comprised of a bias current output circuit 100 for outputting the bias current flowing through the MR head Rmr and a feedback circuit 200 for controlling the output bias current from the bias current output circuit 100, so that a voltage across the MR head Rmr is controlled to be a predetermined value by detecting the voltage variation across the MR head Rmr through which the bias current is flowing.

In the magnetic recording and/or reproducing apparatus having the MR head Rmr connected to the bias circuit a, not only the read MR head Rmr but a write inductive head 400 are provided in a head body 300 that is positioned opposite to a recording disk as shown FIG. 4, and it is so configured to operate either one of the MR head Rmr or the inductive head 400.

Hereinafter, a mode where a playback of the recorded data is carried out from the recording disk by operating the MR head Rmr is called as a read (reproducing) mode, and a mode where a writing of the data is carried out to the recording disk by operating the inductive head 400 is called as a write (recording) mode.

The head body 300 is positioned opposite to the recording disk as mentioned above, and accordingly, the MR head Rmr and the bias circuit a are connected to each other by using a flexible printed circuit board 500, the inductive head 400 is connected to the recording data amplifier circuit 600, and the head body 300 is isolated from an amplifier circuit 700 which includes the aforementioned bias circuit a and the recording data amplifier circuit 600.

The flexible printed circuit board 500 has a bare essential substrate area in order to make the magnetic recording and/or reproducing apparatus as small and light-weight as possible. Further a read signal wiring 800 for connecting the MR head Rmr and the bias circuit a and a write signal wiring 900 for connecting the inductive head 400 and the recording data amplifier circuit 600 are positioned extremely close to each other.

For this purpose, when a writing signal flows through the write signal wiring 900 in the write mode, some cross-talk is sometimes generated in the read signal wiring 800 due to the writing signal, and there occurs a variation in the bias current flowing through the MR head Rmr due to the cross-talk. Accordingly, when the mode is changed from the write mode to the read mode, a recovery time is required for the bias current to be a predetermined bias current value for the read mode, so that it takes a time to start the reading operation. Therefore, in the write mode, it was usual to stop the flow of the bias current through the MR head Rmr by halting the operation of the bias circuit a.

Namely, in a changeover switch SW provided in the bias circuit a in FIG. 3, the changeover switch SW was made ON in the read mode, and the change-over switch SW was made OFF in the write mode.

In FIG. 4, a reference sign 710 designates a control signal line for transmitting control signals for transmitting the read mode for a read signal and for transmitting the write mode for a write signal to the bias circuit a, a read data amplifier 720 for amplifying the read data outputted from the bias circuit a, and further to the recording data amplifier circuit 600. In this case, it is so configured that the control signal line 710 transmits the write signal when not in the read mode and transmits the read signal when not in the write mode.

However, when the operation of the bias circuit a was halted, the following problems occurred.

Namely, when the operation of the bias circuit a is halted by setting the changeover switch SW to OFF, there occur changes in the electrical state of the regulating circuit 110 provided in the bias current output circuit 100 that is prepared in order for the bias current output circuit 100 of the bias circuit a to operate stably. Therefore, when the mode is changed from the write mode to the read mode, a recovery time is required, which is necessary for the regulating circuit 110 to comeback to a predetermined electrical state. Accordingly, it becomes difficult to carry out a stable conduction of the bias current during the recovery time, so that it is not able to start reading the recorded data immediately after the mode is changed from the write mode to the read mode.

Here, the regulating circuit 110 includes an oscillation suppressing capacitor C1 that is provided in the bias current output circuit 100 for the purpose of suppressing the oscillation of the circuit and noise elimination; and the oscillation suppressing capacitor is configured by one oscillation suppressing capacitor C1 in FIG. 3.

If the operation of the bias circuit a is halted in the write mode, the power supply to the regulating circuit 110 is also halted, and thereby, there occurs voltage variation at the oscillation suppressing capacitor C1 of the regulating circuit 110, and the changeover switch SW is made ON, because the read signal is transmitted to the bias circuit a in this condition. Then, charging and discharging of the oscillation suppressing capacitor C1 in the regulating circuit 110 occurs first, so that it becomes difficult to carry out a stable conduction of the bias current until the oscillation suppressing capacitor C1 has a predetermined voltage.

Particularly, the circuit is able to increase a noise reducing effect by using a capacitor having as large a capacity as possible as the oscillation suppressing capacitor C1, so that there is a problem that it takes a long time for the voltage of the oscillation suppressing capacitor C1 to comeback to the predetermined voltage.

SUMMARY OF THE INVENTION

In order to solve the above problems, a bias circuit for a MR head of this invention includes a bias current output circuit for outputting a bias current flowing through the MR head and a feedback circuit for controlling a bias current output from a bias current output circuit, so that a voltage across the MR head is controlled to be a predetermined value by detecting the voltage across the MR head through which the bias current is flowing. Further, the bias circuit for the MR head is so configured that the bias current output circuit includes a regulating circuit for stably operating the bias current output circuit and a control circuit for the regulating circuit for the controlling the regulating circuit to be a predetermined state, and the control circuit for the regulating circuit is started in operation when not in the read mode of the MR head.

Further the regulating circuit is a circuit equipped with an oscillation suppressing capacitor, and the control circuit for the regulating circuit is characterized to be the charging circuit for the oscillation suppressing capacitor.

Namely, when the MR head is in the read mode, the regulating circuit in the bias current output circuit is activated by activating the bias current output circuit, and on the contrary, when the MR head is not in the read mode, namely in the write mode, the regulating circuit is activated by activating the control circuit for the regulating circuit, so that the regulating circuit is always controlled and maintained at a predetermined state.

Accordingly, the bias current output circuit can start the playback of data by the MR head immediately after the mode is changed from the write mode to the read mode, because a read current is ready anytime for flowing, and therefore, the twitching time from the write mode to the read mode can be shortened.

Further, as a result, the recording disk of the magnetic recording and/or reproducing apparatus does not require a waiting interval corresponding to the recovery time of the regulating circuit, and it is able to carry out recording of data during the waiting interval, so that it is also able to improve the recording density in the magnetic recording and/or reproducing apparatus.

In addition, the regulating circuit is a circuit having an oscillation suppressing capacitor, and the control circuit for the regulating circuit is able to simplify the construction of the bias current output circuit without complexity, and also is able to operate it stably when it is the charging circuit for the oscillation suppressing capacitor.

DETAILED DESCRIPTION OF THE PREFERRED EMBODIMENTS

Hereinafter, one embodiment of the present invention is described with reference to the accompanying drawings.

Figure 1:
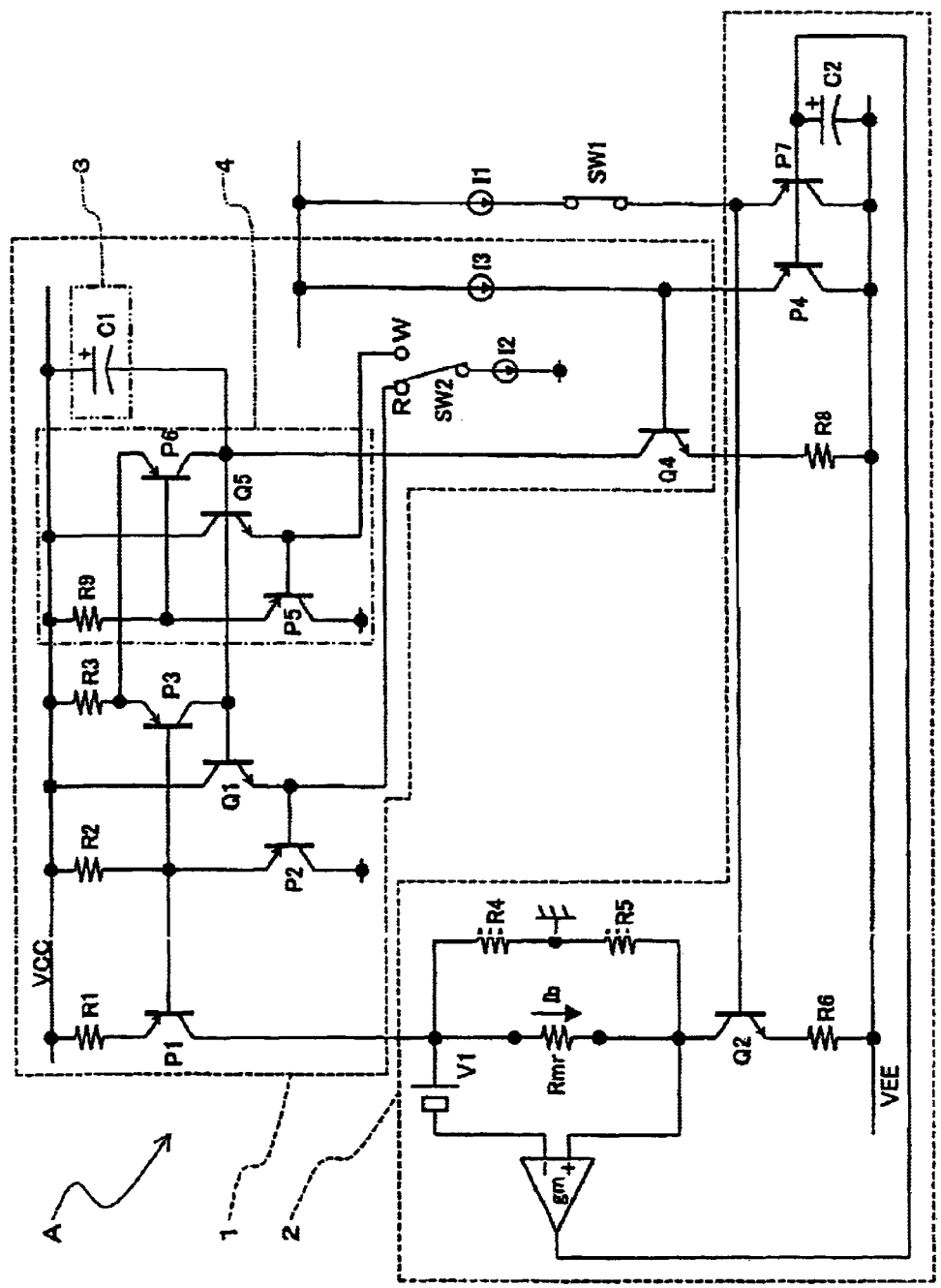
FIG. 1 is a circuit diagram of a bias circuit for a MR head of the present invention in a read mode.
Figure 2:
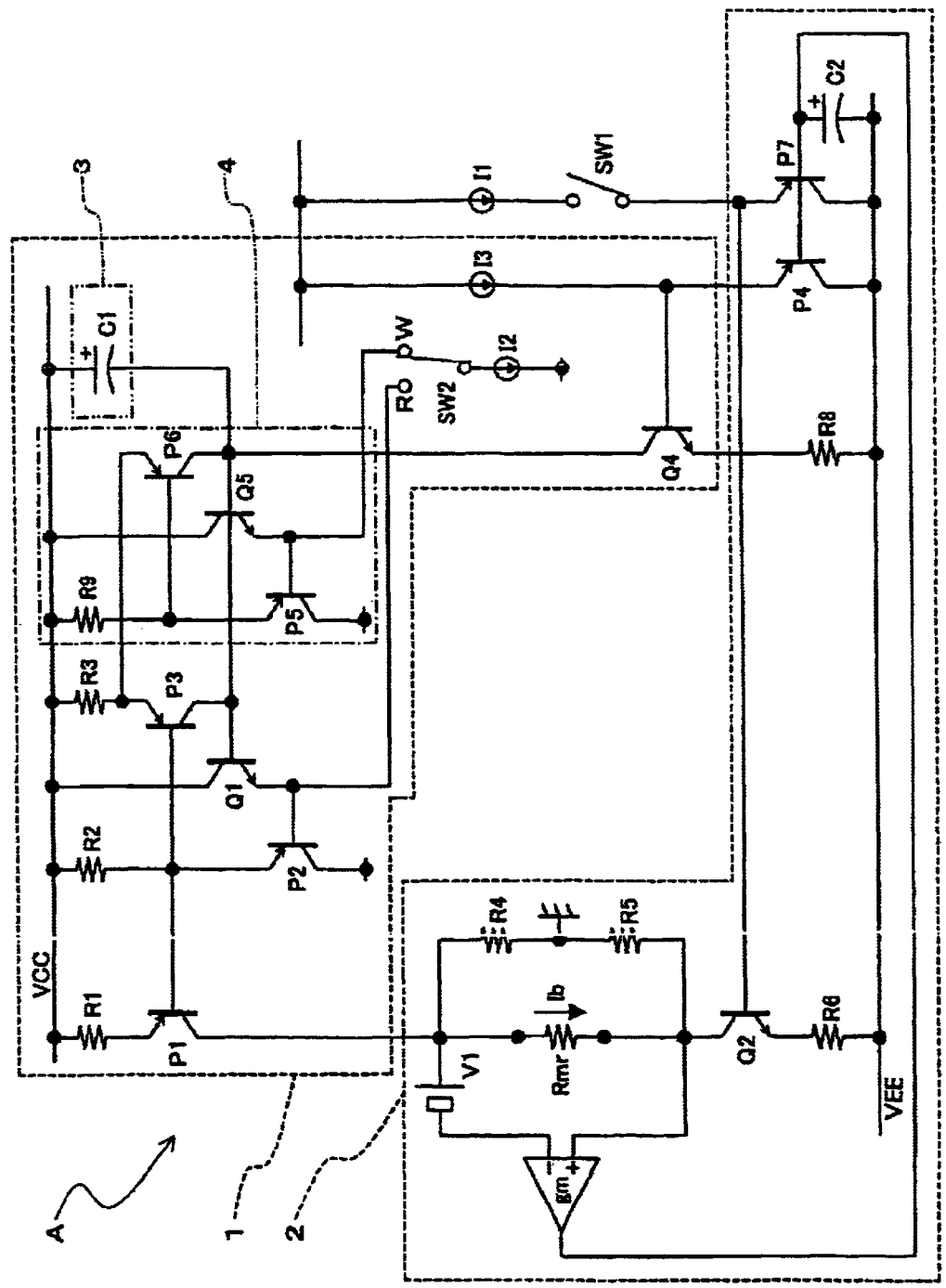
FIG. 2 is a circuit diagram of a bias circuit for a MR head of the present invention in a write mode.
Figure 3:
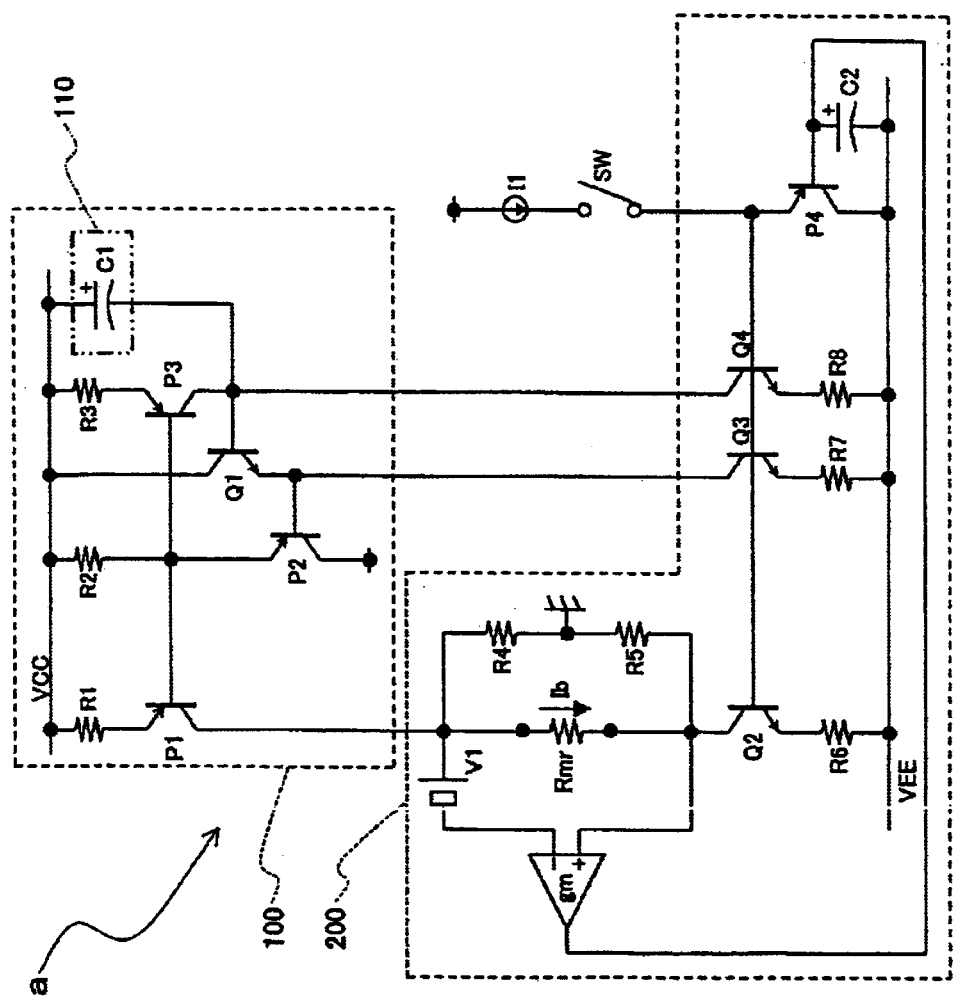
FIG. 3 is a circuit diagram of a conventional bias circuit for a MR head.
Figure 4:
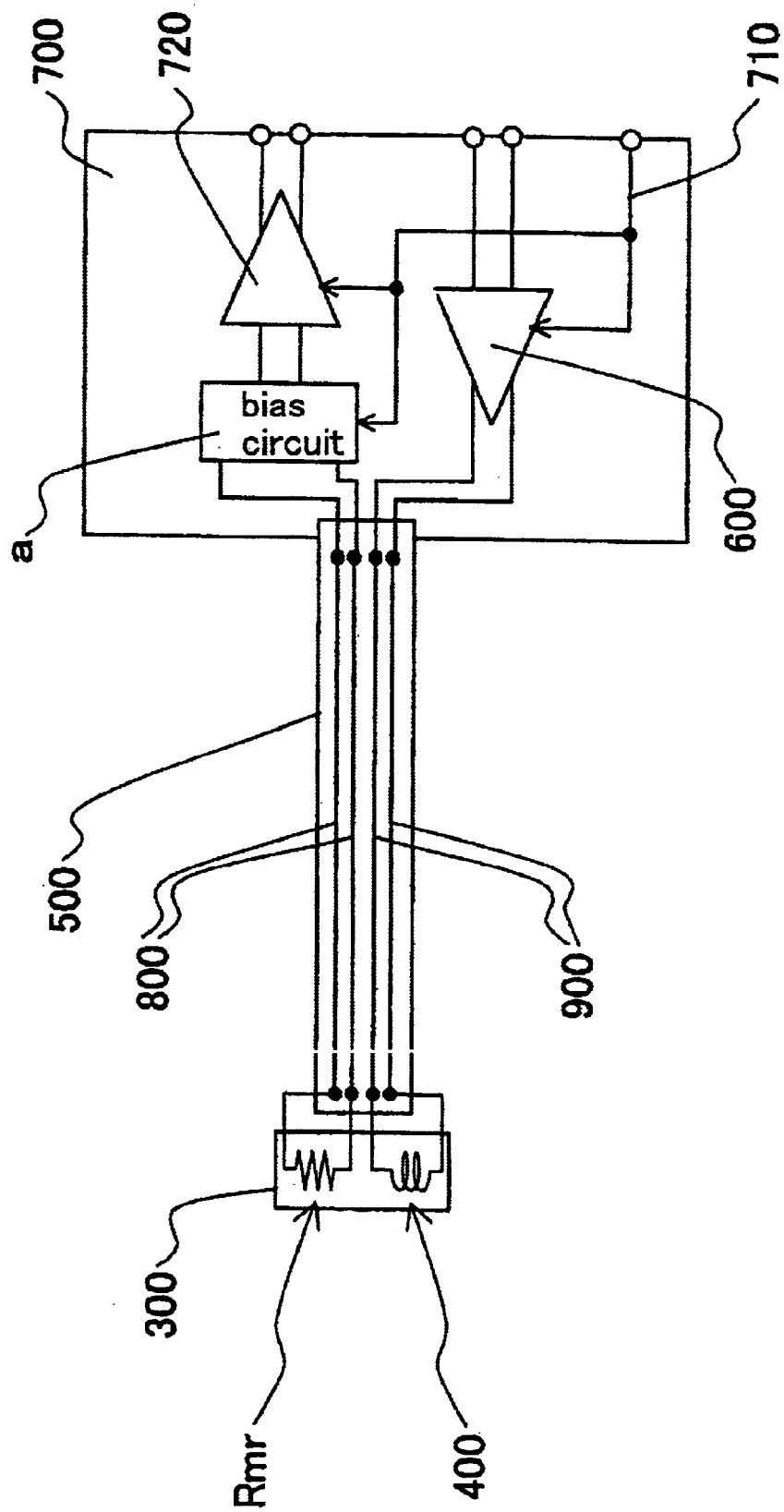
FIG. 4 is a chart for explaining a configuration of a peripheral circuit in the conventional bias circuit for a MR head.

FIG. 1 is a circuit diagram of a bias circuit for a MR head A and is a circuit diagram illustrates the bias circuit for the MR head A particularly in a read mode. FIG. 2 is the bias circuit for the MR head A in a write mode.

The bias circuit for the MR head A is configured with a bias current output circuit 1 for outputting a bias current Ib flowing through the MR head Rmr and a feedback circuit 2 which detects a voltage variation across the MR bead Rmr by a voltage-current converting circuit gm, outputs the detection result as a current, and controls the voltage across the MR head Rmr to be a predetermined value by controlling the bias current output circuit 1 based on the detected current.

The bias current output circuit 1 is a current mirror circuit and is configured to include a first PNP transistor P1 and a third PNP transistor P3, where emitters of the first PNP transistor P1 and the third PNP transistor P3 are connected to an upper-side voltage source $V_{cc}$ through resistors R1, R3, respectively, and bases thereof are connected to each other.

In the bias current output circuit 1 of the present embodiment, a collector of the first PNP transistor P1 is connected to the MR head Rmr and flows the bias current Ib through the MR head Rmr. A collector of the third PNP transistor P3 is connected to a base of the first NPN transistor Q1, an emitter of the first NPN transistor Q1 is connected to a base of the second PNP transistor P2, and an emitter of the second PNP transistor P2 is not only connected to a base of the third PNP transistor P3 but also to the upper-side voltage source $V_{cc}$ through a resistor R2.

By the way, an emitter of the first NPN transistor Q1 and a base of the second PNP transistor P2 are connected to a second current source I2 by way of a second changeover switch SW2.

An operation control of the bias current output circuit 1 is carried out by the fourth NPN transistor Q4, a collector of which is connected to the base of the first NPN transistor Q1. Further, a collector of the fourth NPN transistor Q4 is connected to a first oscillation suppressing capacitor C1, one terminal of which is connected to the upper-side voltage source $V_{cc}$, and is configured to prevent oscillation of the bias current output circuit 1 by the first oscillation suppressing capacitor C1 and to eliminate noise. In the present embodiment, the regulating circuit 3 is configured with a single first oscillation suppressing capacitor C1. An emitter of the fourth NPN transistor Q4 is connected to the lower-side voltage source $V_{EE}$ by way of a resister R8.

Further, in the bias current output circuit 1, there is provided a control circuit 4 for the regulating circuit to be operated by switching a second changeover switch SW2 not in the read mode of the MR head Rmr, namely it is in the write mode.

The control circuit 4 for the regulating circuit serves as a dummy current mirror circuit and is configured to include a sixth PNP transistor P6, a fifth NPN transistor Q5, and a fifth PNP transistor P5. In this case, a collector of the sixth PNP transistor P6 is connected to the collector of the fourth NPN transistor Q4, a base of the fifth NPN transistor Q5 is connected to a collector of the sixth PNP transistor P6, a collector of the fifth NPN transistor Q5 is connected to the upper-side voltage source $V_{cc}$, and an emitter thereof is connected to a second current source I2 by way of the second changeover switch SW2. In addition, a base of the fifth PNP transistor P5 is connected to the emitter of the fifth NPN transistor Q5, and an emitter of the fifth PNP transistor P5 is not only connected to the upper-side voltage source $V_{cc}$ through a resistor R9 but also to the base of the the sixth PNP transistor P6.

An operation control of the fourth NPN transistor Q4 is carried out at the feedback circuit 2, and the feedback circuit 2 is configured as follows. Namely, the feedback circuit 2 comprises a reference voltage source V1 for applying a reference voltage to the MR head Rmr, a voltage-current converting circuit gm for detecting voltage variation across the MR head Rmr to which the reference voltage is applied, a seventh PNP transistor P7 serving as a switch for operating the feedback circuit 2 based on the output from the voltage-current converting circuit gm, a fourth PNP transistor P4 serving as a switch for operating the bias current output circuit 1, and a second NPN transistor Q2 for controlling the flow of the bias current Ib to the MR head Rmr by connecting an emitter of the seventh PNP transistor P7.

A pair of resistors R4 and R5 is connected to both end terminals of the MR head Rmr for setting a center point of the MR head Rmr as the ground potential. Further, an emitter of the second NPN transistor Q2 is connected to the lower-side voltage source $V_{EE}$ through a resistor R6.

A second capacitor C2, one terminal of which is connected to the lower-side voltage source $V_{EE}$, is connected to a base of the seventh PNP transistor P7, and a cutoff frequency of the feedback circuit 2 is determined by the second capacitor C2.

An emitter of the seventh PNP transistor P7, a base of which is connected to output of the voltage-current converting circuit gm, is connected to the first current source I1 by way of the first changeover switch SW1. A collector of the seventh PNP transistor P7 is connected to the lower-side voltage source $V_{EE}$.

Further, an emitter of the fourth PNP transistor P4, a base of which is connected to an output of the voltage-current converting circuit gm, is connected not only to a third current source I3 but also to a base of the fourth NPN transistor Q4 and is configured to carry out the operation control for the bias current output circuit 1. A collector of the fourth PNP transistor P4 is connected to the lower-side voltage source $V_{EE}$.

In the read mode, namely when the first changeover switch SW1 is the ON state, and provided that R1=R3 and R6=R8, the transistors P1 and P3 have the same characteristics, and the transistors Q2 and Q4 have the same characteristics, and when the voltage Vmr of the MR head Rmr is less than the voltage $V_1$ of the reference voltage source V1,−terminal voltage of the voltage-current converting circuit gm is expressed as follows:

(+terminal voltage of the voltage-current converting circuit gm)<(−terminal voltage of the voltage-current converting circuit gm), wherein the voltage of the −terminal voltage of the voltage-current converting circuit gm is (+terminal voltage of the voltage-current converting circuit gm)+ Vmr−$V_1$',and Vnr<$V_1$.

In this case, in the feedback circuit 2, in connection with the increase of the output current of the voltage-current converting circuit gm, the base potential of the seventh PNP transistor P7 and the base potential of the forth PNP transistor P4 are increased.

In connection with the increase in the base potential of the fourth PNP transistor P4, the base potential of the fourth PNP transistor P4 increases, and the bias current Ib outputted from the bias current output circuit 1 is increased, and in addition, in connection with the rise in the base potential of the seventh PNP transistor P7, the base potential of the second NPN transistor Q2 is increased, and also the bias current Ib flowing through the MR head Rmr is increased.

As a result, the voltage Vmr of the MR head Rmr increases, and when the voltage Vmr of the MR head Rmr becomes equal to the voltage $V_1$ of the reference voltage source V1, a feedback for stopping the output of the control current from the voltage-current converting circuit gm is activated.

Further, in the read mode, the base potential of the fourth NPN transistor Q4 becomes Vc2+Vbe, provided that the potential of the second capacitor C2 is Vc2, so that the fourth NPN transistor Q4 always keeps its ON state, and the charging is carried out to the first oscillation suppressing capacitor C1, which is the regulating circuit 3.

On the contrary, in the write mode, namely in the mode where the first changeover switch SW1 is the OFF state and the second change-over switch SW2 connects the second current source I2 and the control circuit 4 for the regulating circuit, a base potential of the fourth NPN transistor Q4 becomes Vc2+Vbe, and accordingly, the fourth NPN transistor Q4 becomes the ON state, so that the charging is carried out to the first oscillation suppressing capacitor C1, which is the regulating circuit 3.

The charging to the first oscillation suppressing capacitor C1 is carried out regardless of the read mode or the write mode by setting the fourth NPN transistor Q4 to be ON state, and the potential across the first oscillation suppressing capacitor C1 is not changed when the mode is changed from the write mode to the read mode. Accordingly, it becomes possible to start the playback immediately after the mode is changed by flowing a predetermined bias current Ib through the MR head Rmr, and shortens the switching time from the write mode to the read mode.

In this case, in the present invention, the control circuit 4 for the regulating circuit serves as a charging circuit for the first oscillation suppressing capacitor C1 by carrying out the charging of the first oscillation suppressing capacitor C1 in connection with the operation of the control circuit 4 for the regulating circuit.

In the present embodiment, the regulating circuit 3 comprises a single first oscillation suppressing capacitor C1, but the invention is not limited to this single first oscillation suppressing capacitor C1, and the regulating circuit 3 may comprise a combination of necessary elements.

What is claimed is:

1. A bias circuit for a magneto-resistive head having a bias current output circuit that enables a bias current to flow through the magneto-resistive head, and a feedback circuit that controls said bias current from a bias current output circuit by detecting voltage variation across said magneto-resistive head so that a voltage across the magneto-resistive head becomes a predetermined value, wherein said bias current output circuit includes a regulating circuit that regulates an operation of said bias current output circuit, and a control circuit that controls said regulating circuit to be in a predetermined condition;

said bias circuit further comprising:
switching means for switching a read/write mode so that said bias current flows to the control circuit of said regulating circuit when said magneto-resistive head is in a mode other than the read mode.

2. The bias circuit of claim 1, wherein said regulating circuit includes an oscillation suppressing capacitor; and said control circuit is a charging circuit that charges said oscillation suppressing capacitor.

3. The bias circuit for a magneto-resistive head comprising:

a bias current output circuit that supplies a bias current to the magneto-resistive head;

a feedback circuit that controls said bias current output circuit so that a voltage across the magneto-resistive head becomes a predetermined value by detecting the voltage across the magneto-resistive head;

a regulating circuit provided in said bias current output circuit that stabilizes the operation of said bias current output circuit;

a control circuit that controls the operation of said regulating circuit;

switch means for switching a read/write mode so that said bias current flows to the control circuit when said magneto-resistive head is in a mode other than the read mode.

* * * * *

UNITED STATES PATENT AND TRADEMARK OFFICE
CERTIFICATE OF CORRECTION

PATENT NO. : 6,947,238 B2 Page 1 of 1
DATED : September 20, 2005
INVENTOR(S) : Kazue Takayoshi It is certified that error appears in the above-identified patent and that said Letters Patent is hereby corrected as shown below:

<u>Column 7,</u>
Line 10, change "The" to -- A --.

Signed and Sealed this

Twenty-first Day of March, 2006

JON W. DUDAS
*Director of the United States Patent and Trademark Office*